United States Patent [19]

Remillieux

[11] 4,284,419

[45] Aug. 18, 1981

[54] DECLOGGING PROCESS FOR FILTRATION INSTALLATION AND IMPROVED FILTRATION INSTALLATION

[75] Inventor: Jean Remillieux, Meudon-la-Foret, France

[73] Assignee: Air Industrie, Courbevoie, France

[21] Appl. No.: 127,068

[22] Filed: Mar. 4, 1980

[30] Foreign Application Priority Data

Mar. 5, 1979 [FR]  France ................................ 79 05609

[51] Int. Cl.³ .................. B01D 46/04; C21B 7/22; C21B 9/14; C21B 9/16
[52] U.S. Cl. ............................. 55/96; 55/385 D; 266/140; 266/141; 266/145; 266/155; 266/156; 266/157
[58] Field of Search ................... 55/96, 97, 302, 303, 55/338, 385 D, 293; 266/140, 141, 144, 145, 154–157, 217; 13/33

[56] References Cited

U.S. PATENT DOCUMENTS

| 1,971,815 | 8/1934 | Halvorsen | 266/141 |
| 3,704,573 | 12/1972 | Koller et al. | 55/96 |
| 3,811,248 | 5/1974 | Lesk et al. | 55/302 |
| 3,964,883 | 6/1976 | Nakao | 55/338 |
| 4,114,862 | 9/1978 | Denjean | 266/155 |

FOREIGN PATENT DOCUMENTS

| 2301952 | 8/1973 | Fed. Rep. of Germany | 266/155 |
| 156753 | 6/1921 | United Kingdom | 55/96 |
| 344227 | 3/1931 | United Kingdom | 55/96 |

*Primary Examiner*—David L. Lacey
*Attorney, Agent, or Firm*—Larson and Taylor

[57] ABSTRACT

The invention relates to an apparatus and a declogging process for filtration installation for dust-laden gases presenting reducing properties, consisting in taking dust-free gas at the outlet of the filtration installation, oxidizing this gas and using the gaseous mixture resulting from this oxidization to declog the filtering element(s) of said installation.

10 Claims, 2 Drawing Figures

DECLOGGING PROCESS FOR FILTRATION INSTALLATION AND IMPROVED FILTRATION INSTALLATION

FIELD OF THE INVENTION

The invention relates to filtering installations for dust-laden gases having reducing properties.

BACKGROUND OF THE INVENTION

The invention relates to declogging processes for such filtering installations, as well as the installations using these processes.

Such dust-laden gases are frequently met with in the electrometallurgical industry and, according to the antipollution norms at present in force, these dust-laden gases must be filtered.

Such dust-laden gases are then filtered in filtration installations which comprise one or more filtering elements having an upstream face which is met by the dust-laden gas and a downstream face, the dust being deposited on said upstream face.

It is necessary to proceed periodically with cleaning of the filtering element(s) to remove the layer of dust deposited on the upstream face, this operation being called "declogging."

It is known to carry out this declogging operation by pneumatic means usually supplied with air.

Under these conditions, the mixture formed by the dust-laden gas (which has reducing properties) and air (which has oxidizing properties) may have explosive properties which present a considerable danger in view of the electrostatic phenomena which may occur at the moment of declogging.

In fact, a declogging operation which results in the loosening of the layer of dust (cake) deposited on the upstream face of each filtering element generates electrostatic charges capable of giving rise to electrostatic phenomena generating electric discharges.

It has already been proposed to carry out the declogging operation with an inert gas (for example nitrogen), but this increases operating costs.

It is an object of the invention to avoid the necessity of using an expensive inert gas.

The invention provides a declogging process and filtration installation whose operating cost is less than that of installations known at this time, while at the same time ensuring the same security against risk of explosion.

SUMMARY OF THE INVENTION

According to the invention, dust-free gas taken at the outlet of the filtration installation is oxidized, and the gaseous mixture resulting from this oxidization is used for declogging the filtering element(s) of the installation.

The filtration installation of the invention comprises pneumatic declogging means for cleaning the filtering element(s) and these declogging means are supplied with combustion gases from a combustion chamber receiving, on the one hand, reducing dust-free gas taken from the outlet of the installation and, on the other hand, oxidizing gas.

Preferably, a heat exchanger for transferring heat energy between these combustion gases and a fluid to be heated is provided between the combustion chamber and pneumatic declogging means.

In accordance with the invention, declogging of the installation is then carried out with an inert gas resulting from the reaction between the reducing dust-free gas and an oxidizing gas, this inert gas being unable to form an explosive mixture, either with the reducing dust-free gas which occupies the filtration installation downstream of the filtering element(s), or with the reducing dust-laden gas which occupies the filtration installation upstream of the filtering element(s).

Furthermore, this inert gas is produced on the site of the installation and just in the required amounts.

Finally, production of this inert gas, resulting from the combustion of the reducing dust-free gas with an oxidizing gas which may be air, produces heat energy which is in part recovered in the circuit through which the fluid to be heated passes.

According to a particularly advantageous application of the invention, the filtration installation is arranged to receive reducing dust-laden gases from a metal-refining furnace, which is itself supplied by a roasting furnace which itself receives:

the reducing dust-free gas coming from the filtration installation, a reheated oxidizing gas coming from the heat exchanger situated downstream of the combustion chamber, a mineral or metal oxide charge, and possibly a complement of oxidizing gas reheated in a heat recuperator through which the dust-laden gases pass before being admitted into the filtration installation.

It will be readily understood that the filtration installation according to the invention may provide, in an electrometallurgical complex, a substantial saving in energy.

The invention consists, apart from the arrangements which have just been discussed, of certain other arrangements which are used preferably at the same time and which will be further discussed hereafter.

The above and other objects, features and advantages of the present invention will become apparent from the following description, given solely by way of non-limiting illustration, when taken in conjunction with the accompanying drawings.

DESCRIPTION OF THE PREFERRED EMBODIMENTS

Figure 1:
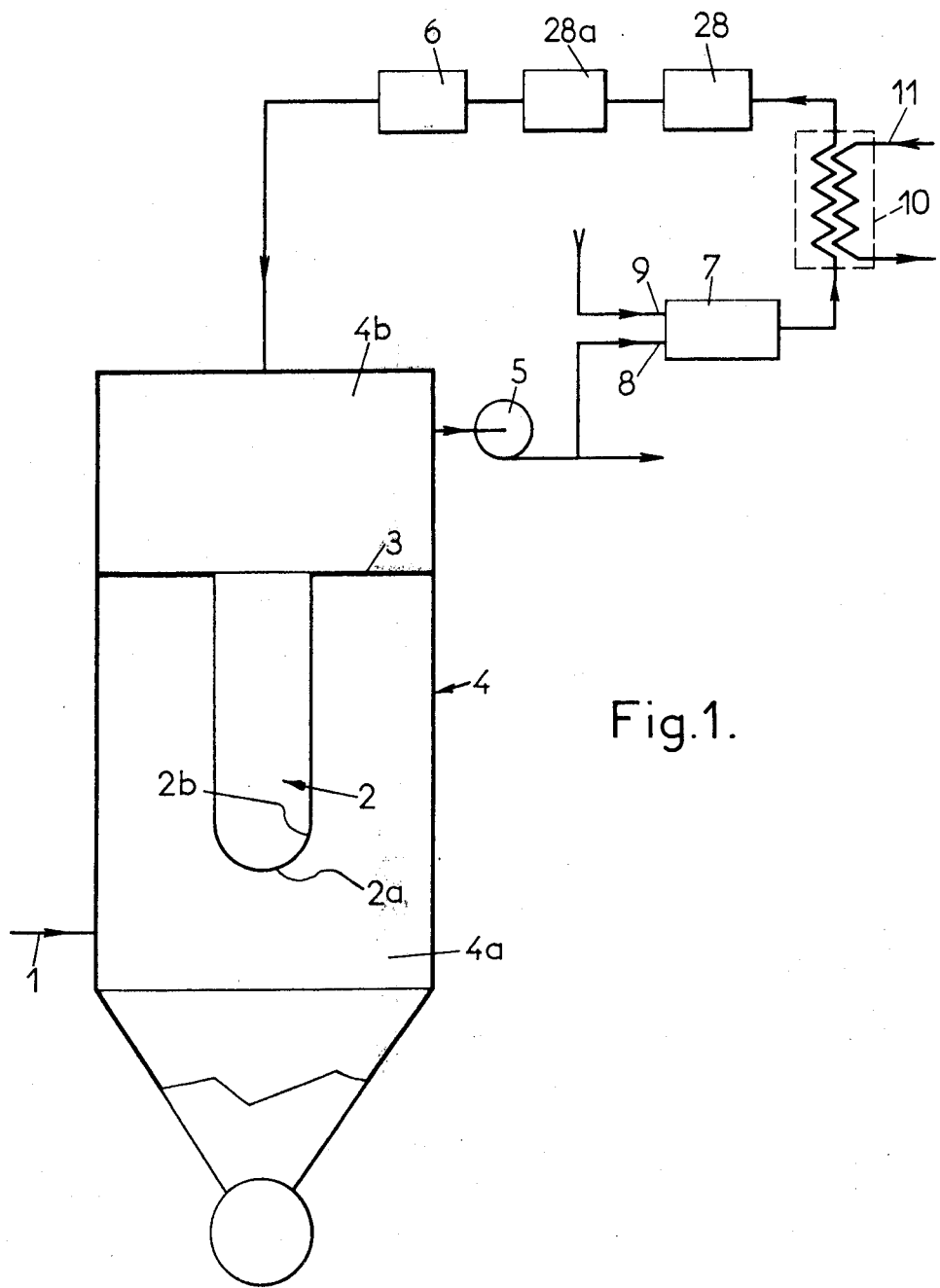
FIG. 1 is a schematic view of a first embodiment of a filtration installation constructed in accordance with the invention.

In FIG. 1 there is shown by way of example a filtration installation coming from an installation not shown, the gas having chemical composition confers on this gas reducing properties.

This gas is conveyed to the filtration installation by duct 1.

The filtration installation comprises one or more filtering elements 2 (only one of which is shown in FIG. 1), this filtering element 2 having an upstream face $2a$, which meets the dust-laden gas, and a downstream face $2b$.

The dust is deposited on upstream face $2a$.

Filtering element 2 is formed by a sleeve held in place by a separating wall 3.

Filtering element 2 is surrounded by an enclosure 4 separated into two parts by the separation wall 3, i.e.:
- an upstream part 4a in which the dust-laden gases are introduced, and
- a downstream part 4b in which the dust-free gas is collected.

This dust-free gas is extracted from the filtration installation by appropriate means such as one or more fans 5.

To clean the filtering element(s) 2, a cleaning (declogging) operation is periodically carried out to remove the layer of dust deposited on the upstream face 2a of filtering element 2.

This declogging operation is carried out with pneumatic means designated generally by the reference figure 6.

These pneumatic declogging means are well-known and their principle of operation is based on sending a blast of gas (generally air) into the downstream part 4b of enclosure 4, this gas blast causing distention or a series of distentions of the filtering element 2 from its downstream face 2b towards its upstream face 2a.

According to the invention, declogging is carried out by taking dust-free gas from the outlet of the downstream part 4b of enclosure 4, oxidizing this gas in a combustion chamber 7, and using the gaseous mixture resulting from this oxidization for declogging the filtering element 2, the declogging means 6 being supplied with said gaseous mixture for this purpose.

This combustion chamber 7 receives then, on the one hand, at 8, reducing dust-free gas taken from the upper part 4b and, on the other hand, at 9, oxidizing gas which may advantageously be air.

A heat exchanger 10 provides transfer of heat energy between the combustion gases from combustion chamber 7 and a fluid to be reheated flowing in a circuit 11.

Figure 2:
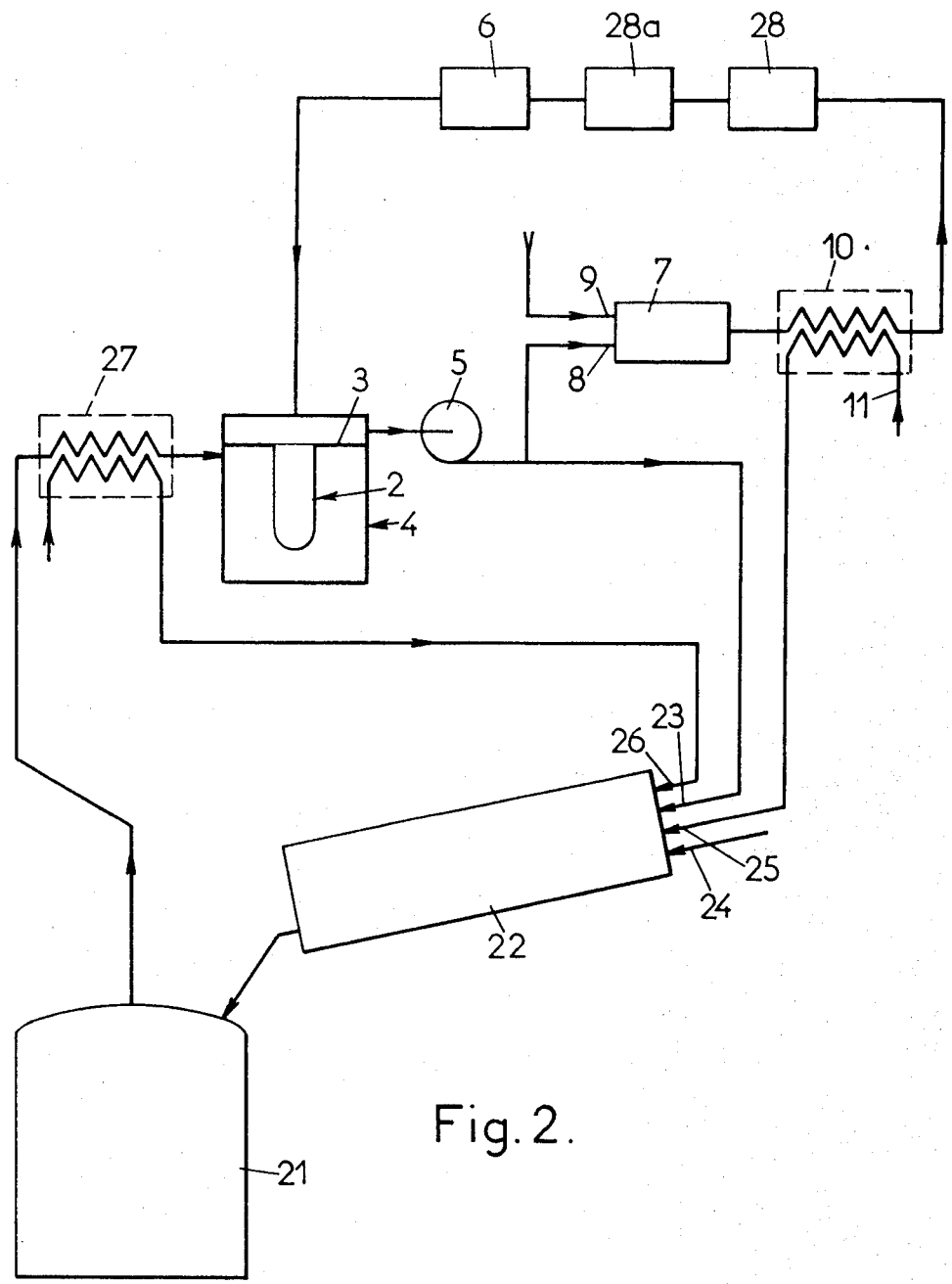
FIG. 2 is a schematic view showing another embodiment of the invention.

In FIG. 2, one embodiment of the invention is shown in a particular application met with in the electrometallurgical industry. In this FIG. 2, the same reference figures designate the same parts as in FIG. 1.

The filtration installation is arranged to receive reducing dust-laden gases from a metal-refining furnace 21 which, itself is supplied by a roasting furnace 22.

The reducing dust-free gas from the filtration installation is directed,
- on the one hand, to declogging means 6 after having been previously oxidized in combustion chamber 7 and cooled in exchanger 10,
- and, on the other hand, at 23, towards roasting oven 22 which also receives, at 24, a mineral or metal oxide charge.

This roasting oven 22 receives, at 25, an oxidizing gas (usually air) which is heated by passing through circuit 11 of exchanger 10.

To complete the oxidizing gas supply for roasting, oven 22 receives at 26 a complement of oxidizing gas (air) which has been heated in a recuperator 27 through which the dust-laden gases pass prior to being admitted into the filtration installation.

A filter 28, followed by an ultrafilter 28a, is advantageously provided upstream of declogging means 6.

It is apparent that within the scope of the invention, modifications and different arrangements can be made other than are here disclosed. The present disclosure is merely illustrative with the invention comprehending all variations thereof.

I claim:

1. In a method of pneumatically declogging a filtering element of a filtration installation in which dust-laden gas having reducing properties is passed through the filtering element whereby dust is deposited on the filtering element and dust-free gas issues therefrom and in which a flow of inert gas is periodically used to dislodge and deposited dust, the improvement wherein said inert gas is obtained by oxidizing a portion of the dust-free gas issuing from the filtering element.

2. An improved method according to claim 1 wherein the inert gas is used to heat a fluid before being used to dislodge said deposited dust.

3. An improved process according to claim 2 wherein said dust-laden gas is generated in a metal refining furnace, wherein said metal refining furnace is charged with material discharged from a roasting furnace, wherein said roasting furnace is charged with a mineral or metal oxide charge, wherein said fluid heated by said inert gas comprises oxidizing gas which is thereafter introduced into said roasting furnace, and wherein a portion of the dust-free gas issuing from said filtering element is introduced into said roasting furnace.

4. An improved method according to claim 3 wherein the dust-laden gas, prior to filtration, is used to heat an oxidizing gas, and wherein the heated oxidizing gas is introduced into said roasting furnace.

5. An improved method according to anyone of claims 1-4 wherein the inert gas flow is filtered upstream of said filter element.

6. In filtration apparatus comprising filtering element means for filtering dust-laden gas having reducing properties, means for passing said gas through said filtering element means whereby dust is deposited on said filtering element means and dust-free gas issues therefrom, and means for periodically introducing a flow of inert gas through said filtering element means in a direction opposite to the direction of flow of said dust-laden gas to dislodge said deposited dust, the improvement which comprises means for oxidizing a portion of the dust-free gas issuing from the filtering element means to obtain said inert gas, and means for supplying the oxidized, inert, gas, to said inert gas flow introducing means.

7. Improved apparatus according to claim 6 further comprising heat exchange means in flow communication with said oxidizing means to heat a fluid by said inert gas prior to supplying said inert gas to said inert gas flow introducing means.

8. Improved apparatus according to claim 7 further comprising a metal refining furnace for generating said dust-laden gas, a roasting furnace, means for charging said metal refining furnace with material discharged from said roasting furnace, means for charging said roasting furnace with a mineral or metal oxide charge, means for introducing the fluid heated by said inert gas into said roasting furnace, and means for introducing a portion of the dust free gas issuing from said filtering element into said roasting furnace.

9. Improved apparatus according to claim 8 further comprising further heat exchange means for heating an oxidizing gas by the dust-laden gas prior to filtration thereof, and means for introducing the heated oxidizing gas into said roasting furnace.

10. Improved apparatus according to any one of claims 6-9 further comprising means for filtering said inert gas in flow communication with said oxidizing means and said supply means.

* * * * *